United States Patent [19]

Corrie et al.

[11] Patent Number: 4,885,822
[45] Date of Patent: Dec. 12, 1989

[54] FOOD COMPRESSOR

[75] Inventors: Narelle G. Corrie; Robert J. R. Read, both of Guildford, Australia

[73] Assignee: Steaka-Maka Marketing Pty Limited, Guildford, Australia

[21] Appl. No.: 111,541

[22] Filed: Oct. 23, 1987

[51] Int. Cl.⁴ .............................................. A22C 11/06
[52] U.S. Cl. ......................................................... 17/39
[58] Field of Search ....................................... 17/32, 39

[56] References Cited

U.S. PATENT DOCUMENTS

| | | | |
|---|---|---|---|
| 2,771,366 | 11/1956 | Shadid | 17/32 X |
| 2,784,448 | 3/1957 | Spang et al. | 17/32 |
| 3,456,285 | 7/1969 | Miller et al. | |
| 3,670,362 | 6/1972 | Hughes | 17/39 |

FOREIGN PATENT DOCUMENTS

| | | |
|---|---|---|
| 0159151 | 10/1985 | European Pat. Off. |
| WO86/01374 | 3/1986 | PCT Int'l Appl. |
| 1287894 | 9/1972 | United Kingdom |
| 1331848 | 9/1973 | United Kingdom |
| 1596379 | 8/1981 | United Kingdom |

Primary Examiner—Willie G. Abercrombie
Attorney, Agent, or Firm—Cushman, Darby & Cushman

[57] ABSTRACT

A food compressor for compressing a composite food mixture into portions which are suitable for cooking. The compressor comprises an elongate open ended chamber which has a shaping device attachable to one end thereof. The shaping device has an opening of predetermined shape which allows food to be extruded therefrom. A concertina bellows powered by a compressed fluid is used to compress the food within the chamber and hence extrude a compressed food mixture.

9 Claims, 3 Drawing Sheets

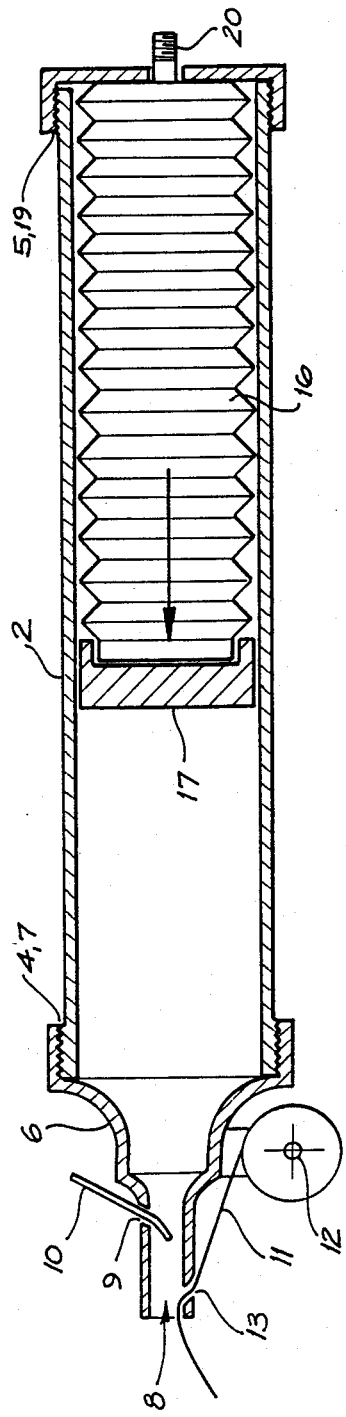
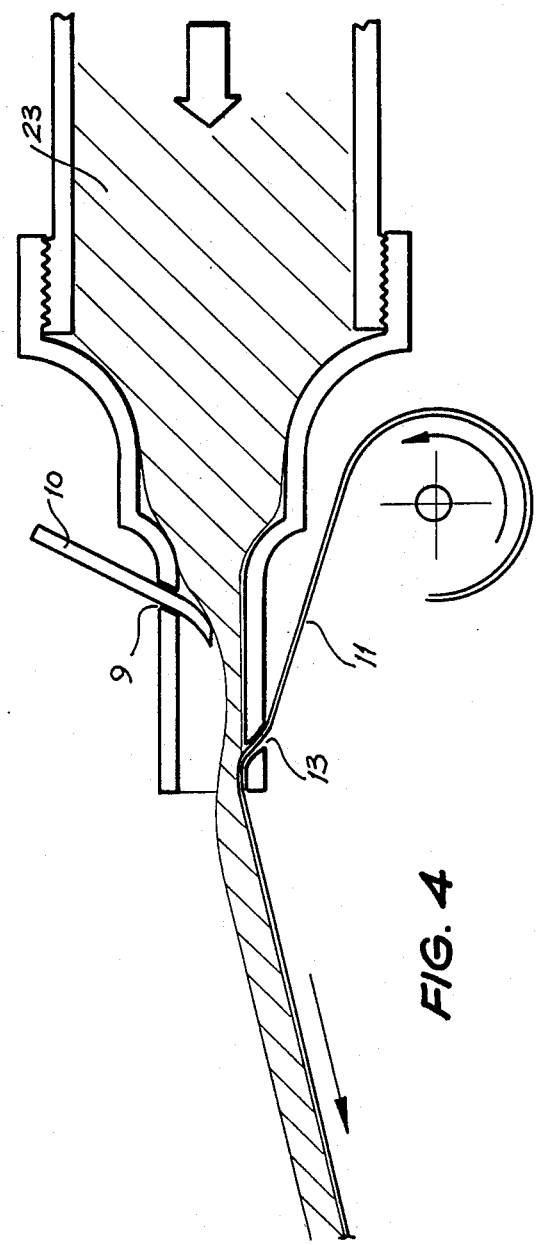
FIG. 3
FIG. 4

FOOD COMPRESSOR

The present invention relates to food compressors, and in particular, to a food compressor which enables a food composite mixture to be easily compressed into portions which are suitable for cooking.

There are known food compressors, usually of the sausage making type, in which a food composite mixture is inserted into a container. The mixture is then compressed by a variety of means, for example, by an auger or by a plate which is forced against the mixture. There are also a variety of ways that the auger or the compression plate can be activated, for example, by an electric motor drive, by a manual handle or by compressed air.

All these above mentioned food compressors have the disadvantage that they are relatively large in size and are relatively costly for the domestic user.

It is an object of the present invention to provide a portable food compressor which substantially reduces the size and cost of the equipment associated with food compressing, and which is simple to use.

According to one aspect of the present invention there is disclosed a food compressor comprising an elongate open ended chamber, a shaping device releasably secured to one end of said chamber, said shaping device having an opening of predetermined shape allowing food to be extruded therethrough, a pneumatically or hydraulically operated drive ram located within and at the other end of said chamber and movable towards said shaping device One embodiment of the present invention will now be described with reference to the drawings in which:

FIG. 3 is a longitudinal cross-section of the food compressor of FIG. 1;

FIG. 4 is an enlarged view similar to FIG. 3 showing in detail the shaping device of the compressor in operation.

Figure 1:
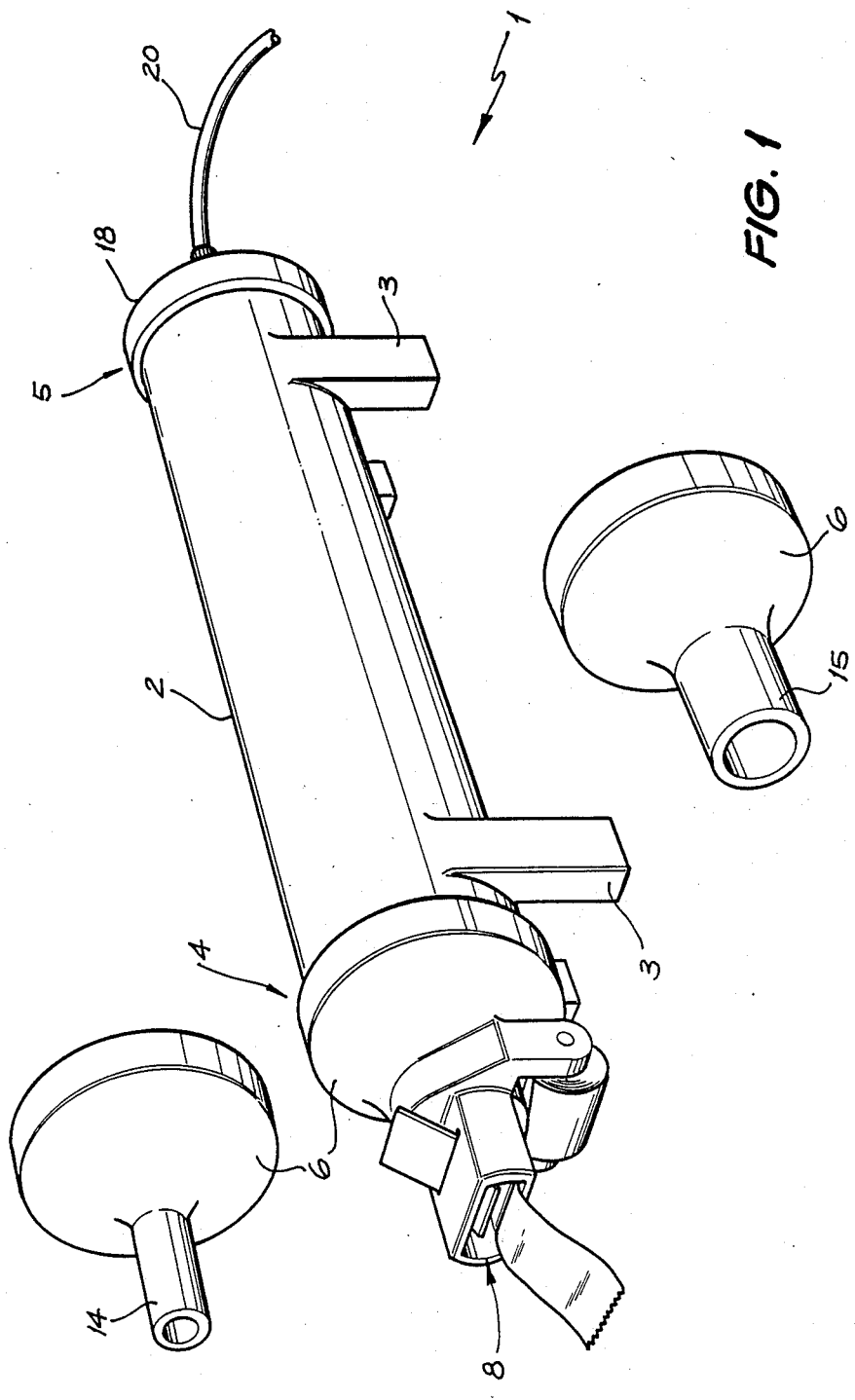
FIG. 1 is a perspective view of a food compressor of a preferred embodiment also showing two substitute nozzles.
Figure 2:
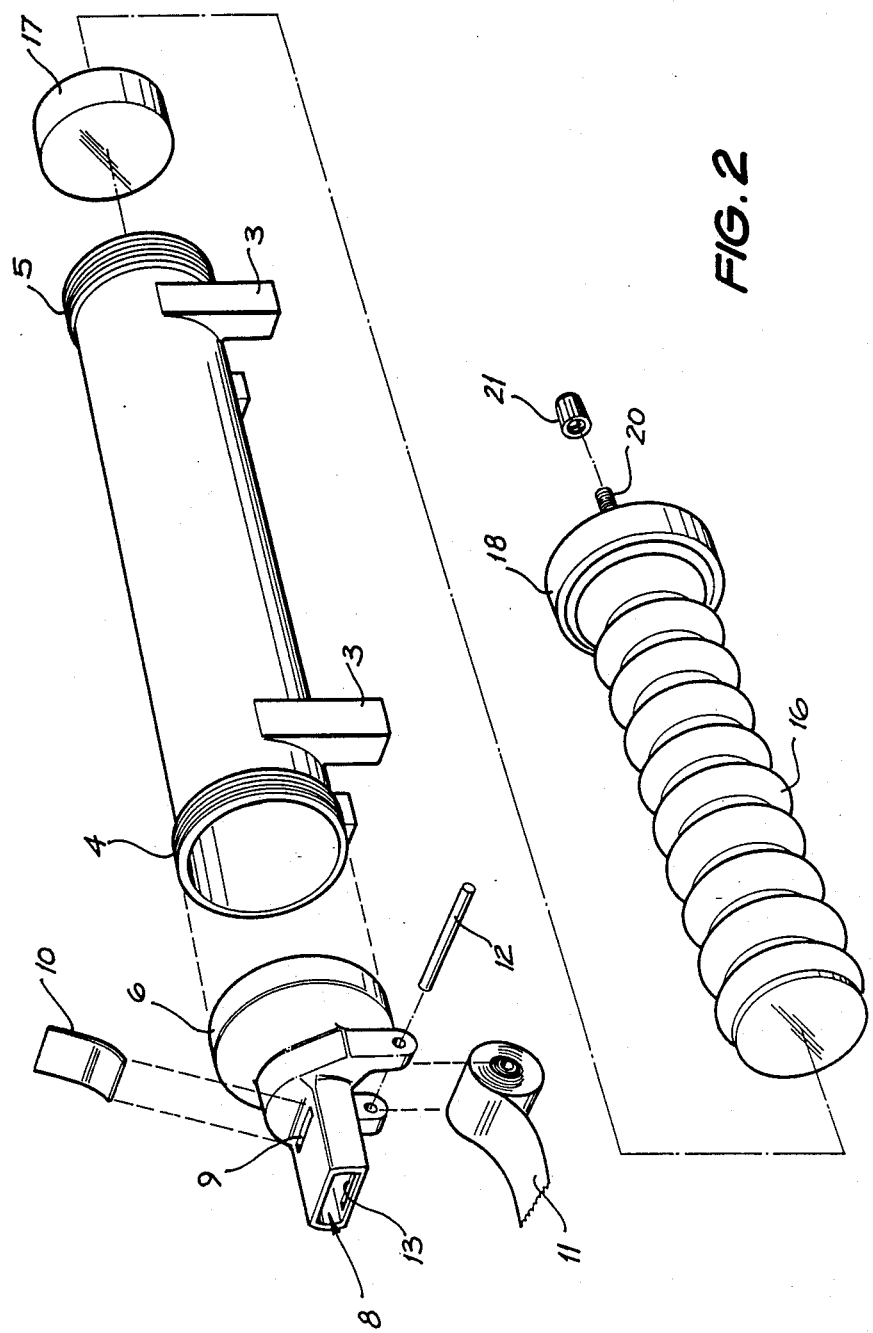
FIG. 2 is an exploded perspective view of the food compressor of FIG. 1.

The food compressor 1 of the preferred embodiment comprises a cylinder 2 having four legs 3. Each of the ends 4 and 5 of the cylinder 2 is threaded on its outer surface. A shaping device 6 has an internal threaded portion 7 which is engageable with the threaded end 4 of the cylinder 2, and has a substantially rectangular opening 8 at its end remote from the cylinder 2.

The shaping device 6 further has a slot 9 cut through its top surface into which a flexible stop 10 is insertable. A roll of paper 11 is rotatable around an axle 12 which is mounted under the device 6. The paper 11 is threaded through a slot 13 on the bottom surface of the device 6, and then passes through the opening 8. The paper 11 is able to be pulled through the opening 8.

Alternate shaping device 6 are illustrated in FIG. 1 and have nozzles 14 and 15 with protruding cylindrical openings of different sizes.

At the end 5 of the cylinder 2, a drive cap 17 and concertina bellows drive ram 16 are insertable into the cylinder 2. The drive ram 16 has an end cap 18 with an internal thread 19 which is engageable with the threaded end 5 of the cylinder 2. Protruding from the end cap 18 is a valved tube 20 which communicates with the interior of the concertina bellows drive ram 16.

A valve cap 21 is fitted to the tube 20 when not in use. A hose 22 is attachable to the tube 20 in use and is connectable to an air pump (not illustrated) so as to supply compressed air to the concertina drive ram 16 to expand the ram 16 inside the chamber 2.

In operation the shaping device 6 is threaded onto the end 4 of the cylinder 2. A food mixture 23 is inserted into the cylinder 2 through the end 5. The drive cap 17 and unexpanded concertina bellows drive ram 16 are then inserted into and threaded onto the cylinder 2 respectively. The air pump is then connected via the hose 22 to the drive ram 16 which expands and which in turn compresses the mixture 23.

By using the stop 10 as illustrated in FIG. 4, the food mixture can be compressed as desired to form a flat strip of food mixture which maintains its extruded shape. The paper 11 rolls out with the food mixture 23 on it so that the mixture 23 is easily handled. If desired, the stop 10 can be momentarily depressed to break the strip into separate lengths.

The nozzles 14 and 15 which can also be threaded onto the end 4 of the cylinder 2 can be used for making sausages or the like. present invention, and modifications obvious to those skilled in the art can be made thereto without departing from the scope of the present invention.

For example, a slide can be attached to the opening 8 of the shaping device 6 to replace the roll of paper 11. The slide would extend to the surface of which the compressor is resting. The food mixture as it is extruded from the device 6 would then move along the slide to where it can then be packaged.

What we claim is:

1. In a food compressor comprising means defining an elongate open ended chamber, a shaping device releasably secured to one end of said chamber, said shaping device having an opening of predetermined shape allowing food to be extruded therethrough, and an air-operated drive ram located within and at the other end of said chamber and movable towards said shaping device, the improvement comprising said compressor being portable and constructed to be free-standing on a supporting surface, an end cap releasably secured to the other end of said chamber, the drive ram including a drive cap and a concertina bellows, one end of said bellows engaging and pushing said drive cap and the other end of said bellows being attached to said end cap, and a valved tube connected to said other end of said bellows and extending through said end cap, the other end of said tube being connectable to an air pump to controllably introduce air under pressure into said bellows.

2. The compressor defined in claim 1 including legs depending from said chamber-defining means to rest on a supporting surface.

3. A food compressor as claimed in claim 1 wherein said chamber is substantially cylindrical, the ends of said chamber are threaded, and said shaping device and said end cap are threadably engaged with said chamber.

4. A food compressor as claimed in claim 1 wherein said shaping device has an opening of substantially round cross-section of a size suitable for introduction into a sausage skin.

5. A food compressor as claimed in claim 1 wherein said shaping device has an opening of substantially rectangular cross-section into which a stop is insertable.

6. A food compressor as claimed in claim 5 wherein said stop is used to reduce the thickness of the extruded food mixture and also for breaking the extruded food mixture into separate lengths.

7. A food compressor as claimed in claim 5 wherein an inclined slide is mounted below said shaping device, and extends to the surface on which said compressor is resting, whereby the food mixture is transported away from the compressor after being extruded.

8. A food compressor as claimed in claim 5 wherein a roll of paper is mounted below said shaping device and is able to be unrolled by the extruded food mixture coming into contact with the free end of the roll of paper.

9. A food compressor as claimed in claim 1 wherein said drive ram is operable by compressed air.

* * * * *